(12) United States Patent
Conciatori

(10) Patent No.: US 12,066,051 B2
(45) Date of Patent: Aug. 20, 2024

(54) FLANGE ASSEMBLY FOR FASTENER RETENTION AND METHOD FOR ASSEMBLING SAME

(71) Applicant: Pratt & Whitney Canada Corp., Longueuil (CA)

(72) Inventor: Michael Conciatori, Montreal (CA)

(73) Assignee: Pratt & Whitney Canada Corp., Longueuil (CA)

( * ) Notice: Subject to any disclaimer, the term of this patent is extended or adjusted under 35 U.S.C. 154(b) by 371 days.

(21) Appl. No.: 17/670,143

(22) Filed: Feb. 11, 2022

(65) Prior Publication Data

US 2023/0258210 A1 Aug. 17, 2023

(51) Int. Cl.
*F16B 5/02* (2006.01)

(52) U.S. Cl.
CPC ...................................... *F16B 5/02* (2013.01)

(58) Field of Classification Search
CPC ........................................................ F16B 5/02
See application file for complete search history.

(56) References Cited

U.S. PATENT DOCUMENTS

| | | | |
|---|---|---|---|
| 10,302,010 | B2 | 5/2019 | Diemer |
| 2013/0202450 | A1 | 8/2013 | Ivakitch |
| 2013/0309078 | A1 | 11/2013 | Vo |

FOREIGN PATENT DOCUMENTS

| | | | |
|---|---|---|---|
| CN | 209511358 U | 10/2019 | |
| DE | 102013017713 B4 | 10/2022 | |
| EP | 3181827 A1 * | 6/2017 | ............ F01D 11/003 |
| EP | 3249180 B1 | 7/2020 | |
| EP | 3181827 B1 | 3/2021 | |

OTHER PUBLICATIONS

English translation EP3181827 A1 (Year: 2017).*
EP Search Report for EP 23155683.8 dated Jun. 21, 2023.

* cited by examiner

*Primary Examiner* — Jason L Vaughan
*Assistant Examiner* — Amanda Kreiling
(74) *Attorney, Agent, or Firm* — Getz Balich LLC

(57) ABSTRACT

A flange assembly includes a primary flange and a secondary flange positioned adjacent the primary flange. The primary flange includes a primary flange body defining a primary bolt aperture. The secondary flange includes a secondary flange body defining a secondary bolt aperture. The flange assembly further includes a bolt. The bolt includes a bolt body extending between a head end and a distal end along a bolt axis. The bolt body includes an annular surface disposed about the bolt axis. The bolt body further includes an annular groove formed in the annular surface and disposed about the bolt axis. The bolt body is positioned within the primary bolt aperture and the secondary bolt aperture. The flange assembly further includes a clip attached to the bolt body within the annular groove. The clip is positioned between the between the primary flange and the secondary flange.

20 Claims, 6 Drawing Sheets

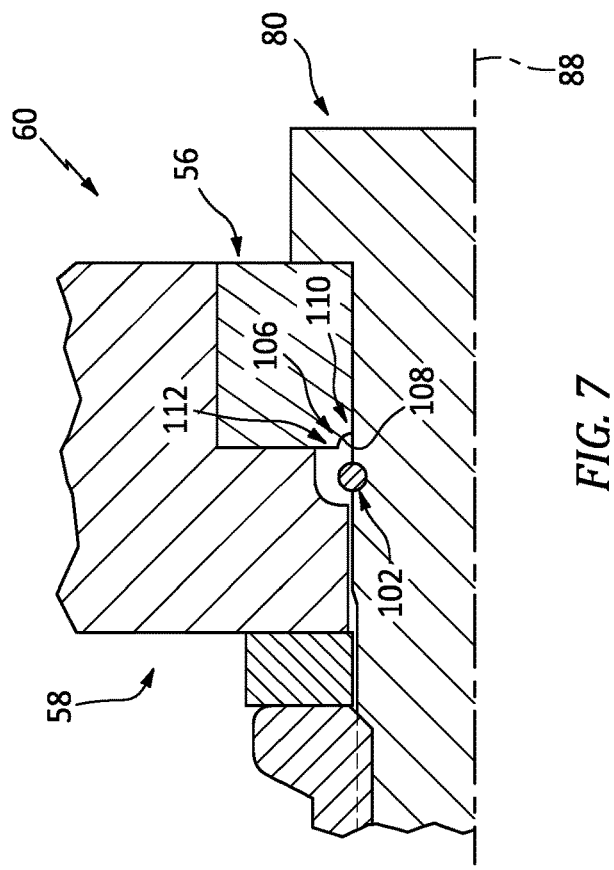
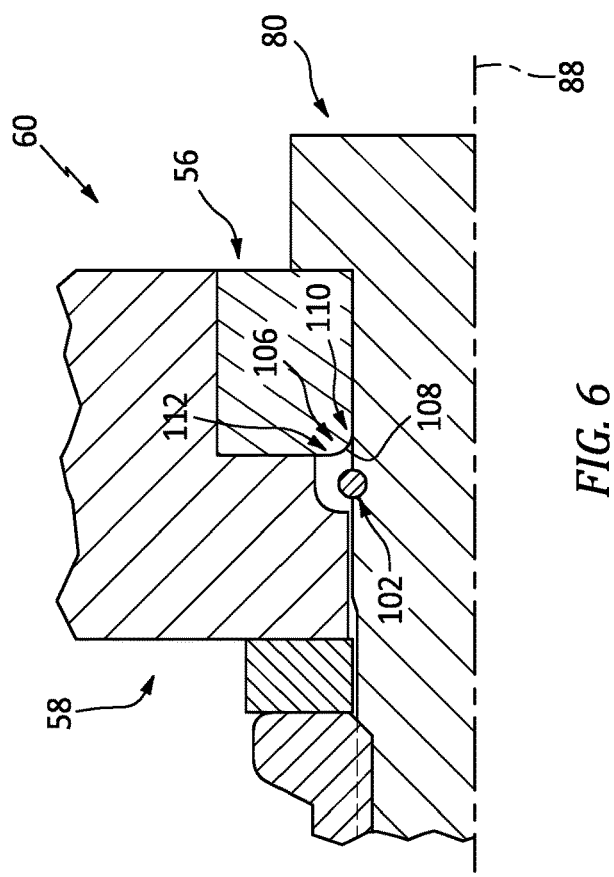

FLANGE ASSEMBLY FOR FASTENER RETENTION AND METHOD FOR ASSEMBLING SAME

TECHNICAL FIELD

This disclosure relates generally to flanges for rotational equipment and more particularly to fastener retention features of flange assemblies.

BACKGROUND OF THE ART

In the assembly of gas turbine engines or other equipment, bolts or other fasteners may be used to securely mount two or more components together. In some cases, one side of a fastener may not be physically accessible at one or more points in the assembly process (e.g., a "blind assembly"). There is a risk during the assembly process that one or more fasteners of a blind assembly may become partially or fully dislodged from their intended fastening position before they can be fully secured (e.g., using a nut). The one or more dislodged fasteners can potentially fall into a portion of the equipment which is no longer accessible. Some amount of disassembly of the equipment may then be needed to recover the one or more dislodged fasteners, thereby increasing the time and cost associated with equipment assembly. Accordingly, improved systems and methods for retaining fasteners during assembly are needed.

SUMMARY

It should be understood that any or all of the features or embodiments described herein can be used or combined in any combination with each and every other feature or embodiment described herein unless expressly noted otherwise.

According to an aspect of the present disclosure, a flange assembly includes a primary flange and a secondary flange positioned adjacent the primary flange. The primary flange includes a primary flange body. The primary flange body includes a first primary surface and a second primary surface opposite the first primary surface. The primary flange body defines a primary bolt aperture extending from the first primary surface to the second primary surface. The secondary flange includes a secondary flange body. The secondary flange body includes a first secondary surface and a second secondary surface opposite the first secondary surface. The secondary flange body defines a secondary bolt aperture extending from the first secondary surface to the second secondary surface. The flange assembly further includes a bolt. The bolt includes a bolt body extending between a head end and a distal end along a bolt axis. The bolt body includes an annular surface disposed about the bolt axis. The bolt body further includes an annular groove formed in the annular surface and disposed about the bolt axis. The bolt body is positioned within the primary bolt aperture and the secondary bolt aperture. The bolt further includes a nut detachably mounted to the bolt body such that the primary flange and the secondary flange are positioned between the head end and the nut with the head end adjacent the primary flange. The flange assembly further includes a clip attached to the bolt body within the annular groove. The clip is positioned between the between the primary flange and the secondary flange.

In any of the aspects or embodiments described above and herein, the secondary flange body may include an annular recess formed between the secondary bolt aperture and the first secondary surface and the clip may be axially positioned within the annular recess.

In any of the aspects or embodiments described above and herein, the flange assembly may further include a washer disposed about the bolt body and positioned between the primary flange and the second flange. The washer may be positioned axially within the recess of the secondary flange body.

In any of the aspects or embodiments described above and herein, the washer may be positioned radially outside of the clip.

In any of the aspects or embodiments described above and herein, the primary flange body may include an annular projection. The annular projection may extend axially from the second primary surface toward the first secondary surface. The annular projection may be positioned within the recess of the secondary flange body.

In any of the aspects or embodiments described above and herein, the annular projection may be positioned radially outside of the clip.

In any of the aspects or embodiments described above and herein, a first radial portion of the clip may be positioned radially inside the groove and a second radial portion of the clip may be positioned radially outside of the groove.

In any of the aspects or embodiments described above and herein, the primary flange body may include an annular recess extending from the primary bolt aperture to the second primary surface. The annular recess may be positioned axially adjacent the clip. The annular recess may include an axially extending surface and a radially extending surface. The axially extending surface may be spaced from the annular surface of the bolt body by a distance and the distance may be less than a cross-sectional diameter of the clip.

In any of the aspects or embodiments described above and herein, the primary flange body may include an annular chamfer extending from the primary bolt aperture to the second primary surface. The annular chamfer may be positioned axially adjacent the clip.

In any of the aspects or embodiments described above and herein, the annular chamfer may include a chamfer surface extending between an inner radial chamfer end and an outer radial chamfer end.

In any of the aspects or embodiments described above and herein, the chamfer surface may be flat in a direction extending between the inner radial chamfer end and the outer radial chamfer end.

In any of the aspects or embodiments described above and herein, the clip may include a cross-sectional flat surface.

In any of the aspects or embodiments described above and herein, the cross-sectional flat surface may be substantially parallel to the chamfer surface of the annular chamfer of the primary flange body.

In any of the aspects or embodiments described above and herein, the chamfer surface may be disposed at an angle relative to a radial line. The angle may be between 20 and 60 degrees.

In any of the aspects or embodiments described above and herein, the chamfer surface may be convex between the inner radial chamfer end and the outer radial chamfer end.

In any of the aspects or embodiments described above and herein, the chamfer surface may be concave between the inner radial chamfer end and the outer radial chamfer end.

According to another aspect of the present disclosure, a method for assembling a flange assembly includes inserting a bolt, in a first axial direction, into a primary bolt aperture of a primary flange. The bolt includes a bolt body extending between a head end and a distal end along a bolt axis. The bolt body includes an annular surface disposed about the bolt axis. The bolt body further includes an annular groove formed in the annular surface and disposed about the bolt axis. The primary flange including a primary flange body. The primary flange body includes a first primary surface and a second primary surface opposite the first primary surface. The method further includes installing a clip onto the bolt so that the clip is attached to the bolt body within the annular groove. The method further includes installing a secondary flange onto the bolt in a second axial direction, opposite the first axial direction, so that the bolt body is positioned within a secondary bolt aperture of the secondary flange with the secondary flange positioned adjacent the primary flange and with the clip positioned between the primary flange and the secondary flange. The secondary flange includes a secondary flange body. The secondary flange body includes a first secondary surface and a second secondary surface opposite the first secondary surface. The method further includes mounting a nut to the bolt body with the primary flange and the secondary flange positioned between the head end and the nut.

In any of the aspects or embodiments described above and herein, the secondary flange body may include an annular recess formed between the secondary bolt aperture and the first secondary surface. The clip may be axially positioned within the annular recess, subsequent to the step of installing the secondary flange.

In any of the aspects or embodiments described above and herein, the primary flange body may include an annular chamfer extending from the primary bolt aperture to the second primary surface. The annular chamfer may be positioned axially adjacent the clip, subsequent to the step of installing the clip onto the bolt.

According to another aspect of the present disclosure, a flange assembly includes a primary flange including a primary flange body. The primary flange body includes a first primary surface and a second primary surface opposite the first primary surface. The primary flange body defines a primary bolt aperture extending from the first primary surface to the second primary surface. The primary flange body includes an annular chamfer extending from the primary bolt aperture to the second primary surface. The flange assembly further includes a bolt. The bolt includes a bolt body extending between a head end and a distal end along a bolt axis. The bolt body includes an annular surface disposed about the bolt axis. The bolt body further includes an annular groove formed in the annular surface and disposed about the bolt axis. The bolt body is positioned within the primary bolt aperture with the head end adjacent the first primary surface. The flange assembly further includes a clip attached to the bolt body within the annular groove. The clip is positioned axially adjacent the annular chamfer.

The present disclosure, and all its aspects, embodiments and advantages associated therewith will become more readily apparent in view of the detailed description provided below, including the accompanying drawings.

DESCRIPTION OF THE DRAWINGS

FIG. 6 illustrates a side cross-sectional view of a flange assembly for the compressor section of FIG. 2, in accordance with one or more embodiments of the present disclosure.

FIG. 7 illustrates a side cross-sectional view of a flange assembly for the compressor section of FIG. 2, in accordance with one or more embodiments of the present disclosure.

DETAILED DESCRIPTION

Figure 1:
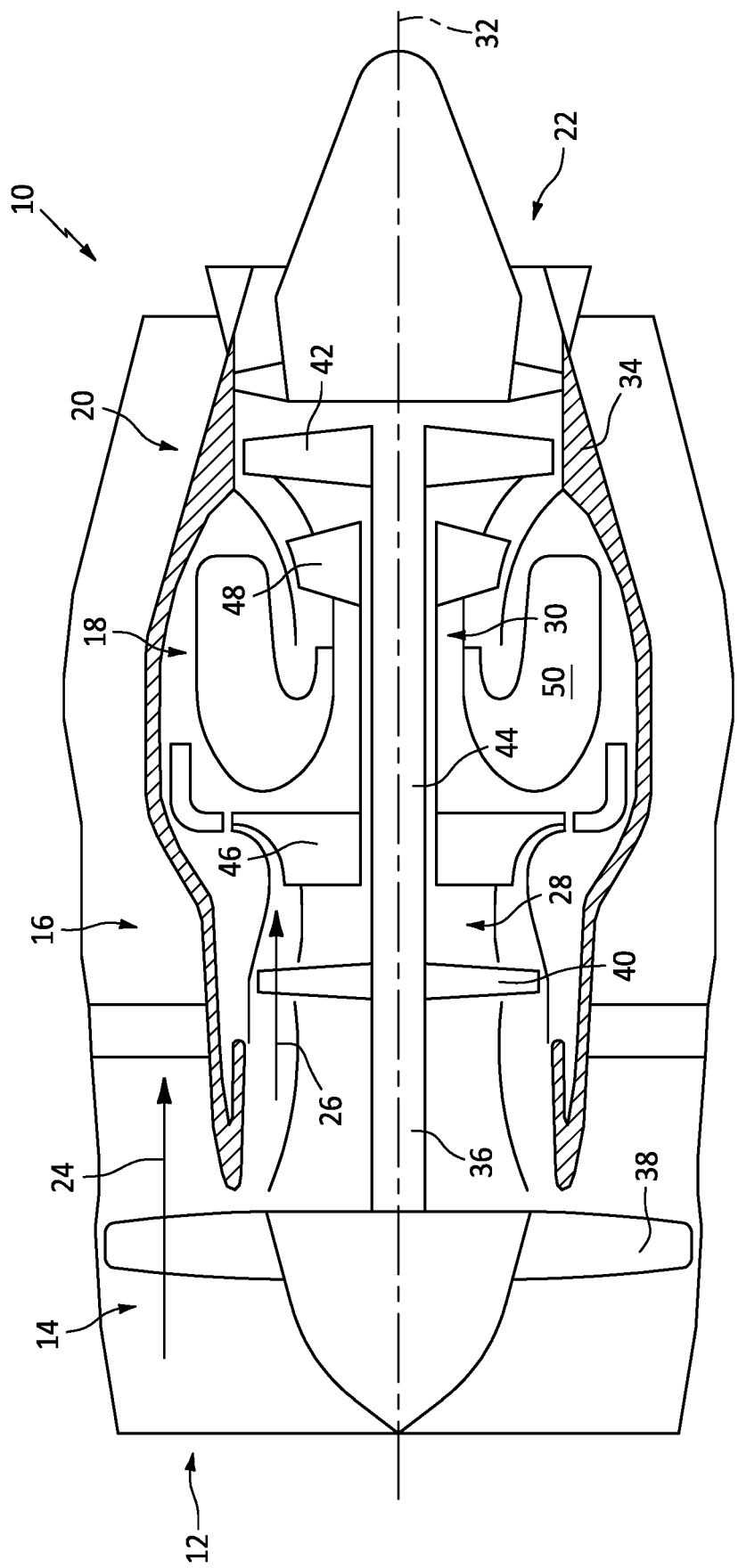
FIG. 1 illustrates a schematic cross-sectional view of a gas turbine engine, in accordance with one or more embodiments of the present disclosure.
Figure 3:
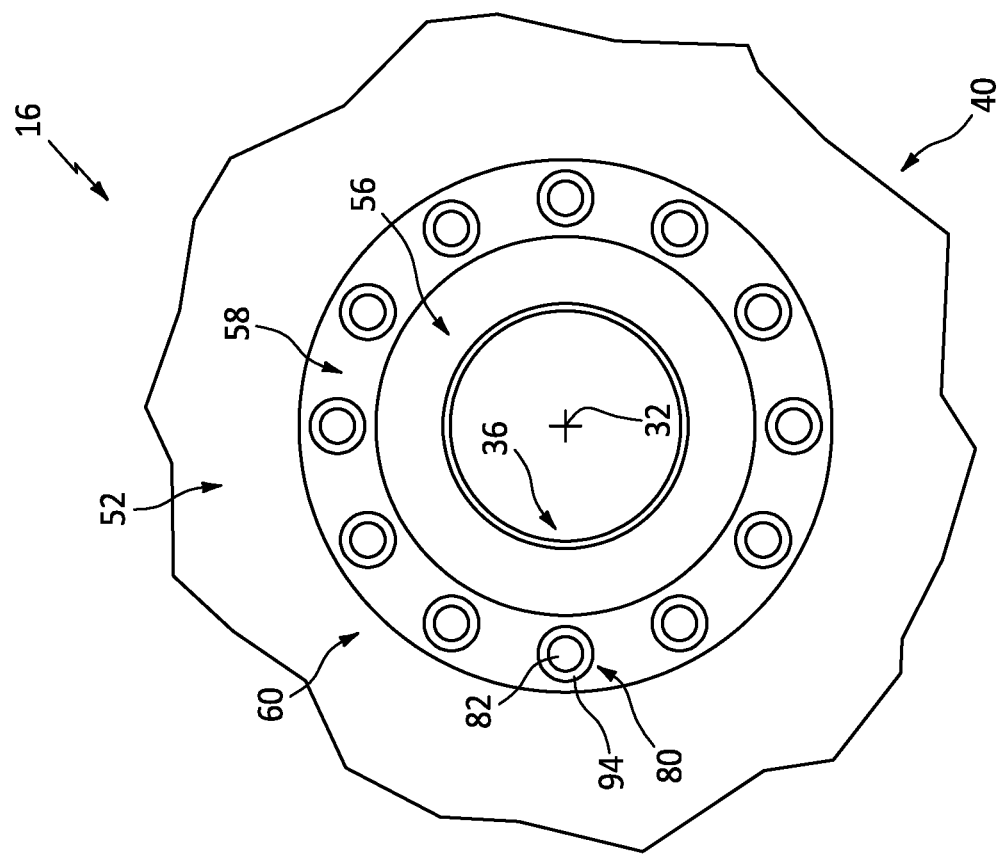
FIG. 3 illustrates a front view of a portion of the compressor section of FIG. 2, in accordance with one or more embodiments of the present disclosure.
Figure 2:
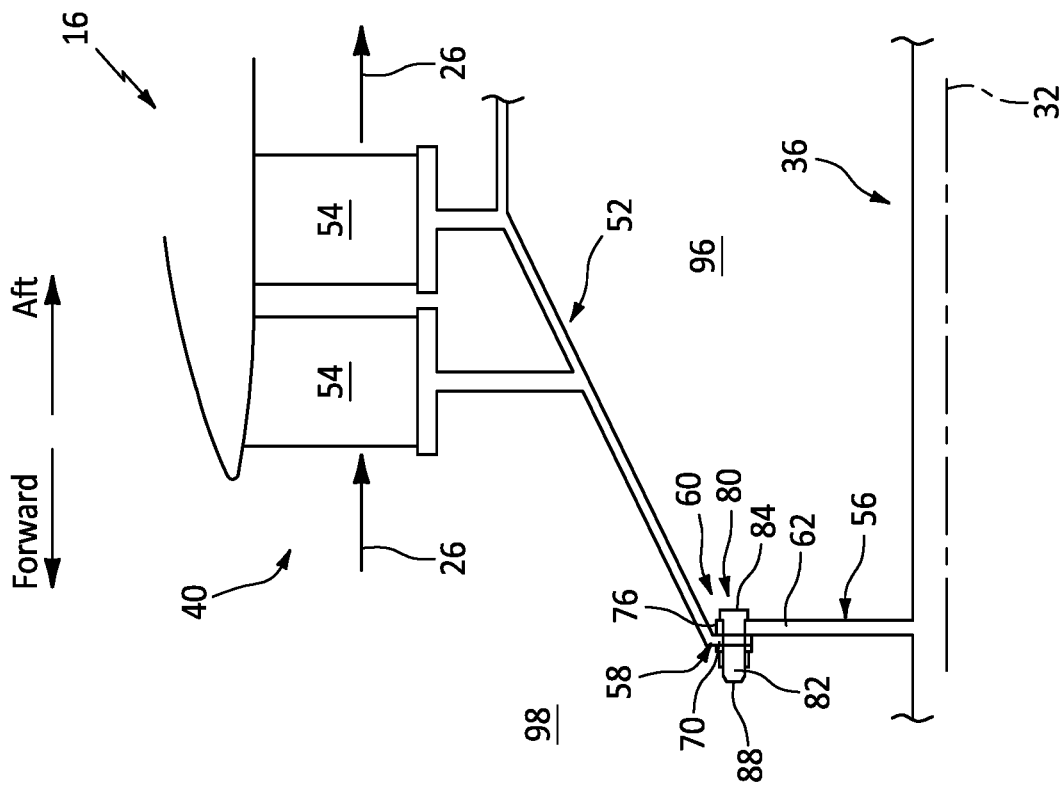
FIG. 2 illustrates side cross-sectional view of a compressor section of the gas turbine engine of FIG. 1, in accordance with one or more embodiments of the present disclosure.

Referring to FIGS. 1-3, an exemplary gas turbine engine 10 is schematically illustrated. The gas turbine engine 10 is disclosed herein as a two-spool turbofan engine that generally includes an inlet 12, a fan section 14, a compressor section 16, a combustor section 18, a turbine section 20, and an exhaust section 22. The fan section 14 drives air along a bypass flow path 24 while the compressor section 16 drives air along a core flow path 26 for compression and communication into the combustor section 18 and then expansion through the turbine section 20. Although depicted as a turbofan gas turbine engine in the disclosed non-limiting embodiments, it should be understood that the concepts described herein are not limited to use with turbofans as the teachings may be applied to other types of gas turbine engines including those with single-spool or three-spool architectures. Moreover, aspects of the present disclosure are not limited in application to gas turbine engines and may be applicable to other aircraft propulsion systems as well.

The gas turbine engine 10 of FIG. 1 includes a low-pressure spool 28 and a high-pressure spool 30 mounted for rotation about a longitudinal centerline 32 (e.g., a rotational axis) of the gas turbine engine 10 relative to an engine static structure 34 (e.g., an engine case). The low-pressure spool 28 includes a low-pressure shaft 36 that interconnects a fan 38, a low-pressure compressor 40, and a low-pressure turbine 42. The high-pressure spool 30 includes a high-pressure shaft 44 that interconnects a high-pressure compressor 46 and a high-pressure turbine 48. It is to be understood that "low pressure" and "high pressure" or variations thereof as used herein are relative terms indicating that the high pressure is greater than the low pressure. An annular combustor 50 is disposed between the high-pressure compressor 46 and the high-pressure turbine 48 along the longitudinal centerline 32. The low-pressure shaft 36 and the high-pressure shaft 44 are concentric and rotate about the longitudinal centerline 32.

Airflow along the core flow path 26 is compressed by the low-pressure compressor 40, then the high-pressure compressor 46, mixed and burned with fuel in the combustor 50, and then expanded over the high-pressure turbine 48 and the low-pressure turbine 42. The low-pressure turbine 42 and the high-pressure turbine 48 rotationally drive the low-pressure spool 28 and the high-pressure spool 30, respectively, in response to the expansion.

FIGS. 2 and 3 illustrate a portion of the compressor section 16 including a mating interface between the low-pressure compressor 40 and the low-pressure shaft 36. The low-pressure compressor 40 of FIG. 2 includes a low-pressure compressor module 52 including a plurality of circumferentially-spaced compressor blades 54. The compressor blades 54 are positioned within the core flow path 26 and mounted for rotation about the longitudinal centerline 32. The low-pressure shaft 36 includes a low-pressure shaft flange 56 (hereinafter a "primary flange 56"). The low-pressure compressor module 52 further includes a low-pressure compressor flange 58 (hereinafter a "secondary flange 58"), for example, at an upstream end of the low-pressure compressor module 52. As will be discussed in further detail, the primary flange 56 and the secondary flange 58 are fixedly mounted to one another at a flange assembly 60.

Figure 4:
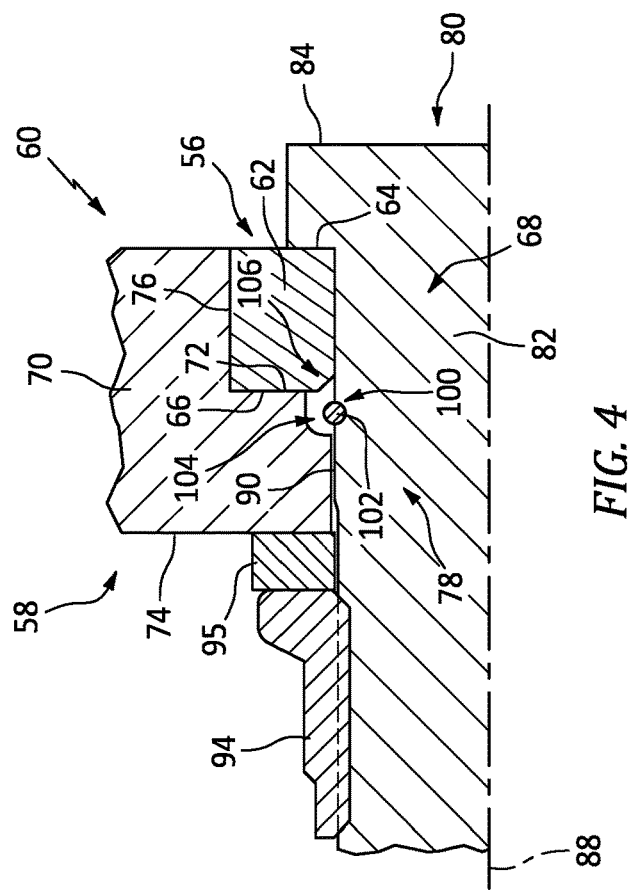
FIG. 4 illustrates a side cross-sectional view of a flange assembly for the compressor section of FIG. 2, in accordance with one or more embodiments of the present disclosure.

Referring to FIGS. 2-4, the primary flange 56 includes a primary flange body 62 extending outward from the longitudinal centerline 32 to a distal end 76. The primary flange body 62 includes a first primary surface 64 and a second primary surface 66 opposite the first primary surface 64. The primary flange body 62 defines a plurality of circumferentially-spaced primary bolt apertures 68 extending through the primary flange body 62 from the first primary surface 64 to the second primary surface 66. The secondary flange 58 includes a secondary flange body 70. The secondary flange body 70 includes a first secondary surface 72 and a second secondary surface 74 opposite the first secondary surface 72. The first secondary surface 72 of the secondary flange body 70 is positioned in contact with the second primary surface 66 of the primary flange body 62. The secondary flange body 70 may additionally be positioned in contact with other portions of the primary flange body 62 such as, for example, the distal end 76. The secondary flange body 70 defines a plurality of circumferentially-spaced secondary bolt apertures 78 extending through the primary flange body 70 from the first secondary surface 72 to the second secondary surface 74. Each secondary bolt aperture 78 of the plurality of secondary bolt apertures 78 is aligned with a respective one of the plurality of primary bolt apertures 68.

The flange assembly 60 includes a plurality of bolts 80 or other fasteners configured to couple the primary flange 56 and the secondary flange 58. Each bolt 80 includes a bolt body 82 extending between a head end 84 and a distal end 86 along a bolt axis 88 (e.g., a center axis of the bolt 80). The bolt body 82 includes an annular surface 90 located between the head end 84 and the distal end 86. The annular surface 90 is disposed about the bolt axis 88. The bolt body 82 of each bolt 80 is positioned within respective ones of the plurality of primary bolt apertures 68 and the plurality of secondary bolt apertures 78. Each bolt 80 further includes a nut 94 detachably mounted (e.g., threadably mounted) to the bolt body 82 such that the primary flange 56 and the secondary flange 58 are positioned between the head end 84 and the nut 94 with the head end 84 adjacent the primary flange 56 and the nut 94 adjacent the secondary flange 58. In some embodiments, the bolt 80 may include an annular washer 95 positioned between the nut 94 and the secondary flange 58.

Referring again to FIG. 2, during assembly of the flange assembly 60, the plurality of bolts 80 may be installed in the respective plurality of primary bolt apertures 68 of the primary flange 56. The plurality of bolts 80 of FIG. 2 may be installed, for example, in a forward axial direction with respect to the longitudinal centerline 32. With the plurality of bolts 80 installed in the primary flange 56, the low-pressure compressor module 52 may be installed. The secondary flange 58 of the low-pressure compressor module 52 may be installed into the flange assembly 60 such that the plurality of bolts 80 are positioned in the respective plurality of secondary bolt apertures 78 of the secondary flange 58. The secondary flange 58 of FIG. 2 may be installed, for example, in an aft axial direction with respect to the longitudinal centerline 32. In other words, the secondary flange 58 may be installed in a direction in opposition to the direction of installation for the plurality of bolts 80.

Once the secondary flange 58 has been installed on the flange assembly 60, a portion of the compressor section 16 may become physically inaccessible to operators performing the assembly process due to physical obstruction by the secondary flange 58 and the low-pressure compressor module 52. The inaccessible portion of the compressor section 16 is identified in FIG. 2 as the inaccessible side 96 of the flange assembly 60. An opposing side of the flange assembly 60 remains physically accessible to the operators performing the assembly process and is identified in FIG. 2 as the accessible side 98 of the flange assembly 60. As shown in FIG. 2, the head end 84 of each bolt body 82 is positioned within the inaccessible side 96 and physical access to the head end 84 of each bolt body 82 may not be possible without removal of the secondary flange 58.

Installation of the low-pressure compressor module 52, including the secondary flange 58, as well as subsequent assembly steps for the gas turbine engine 10, presents a risk of causing one or more of the plurality of bolts 80 to become dislodged from the flange assembly 60 and to fall into the inaccessible side 96. Dislodging of bolts 80 can occur, for example, as a result of collisions while installing the low-pressure compressor module 52, positioning torquing tools (e.g., a torque measuring system (TMS)), or while torquing or untorquing the nuts 94 of the respective bolts 80. Any bolts 80 which become dislodged from the flange assembly 60 must be recovered, which may require removal of the low-pressure compressor module 52 and/or other components of the gas turbine engine 10. While aspects of the present disclosure are described herein with respect to an exemplary mating interface between the low-pressure compressor 40 and the low-pressure shaft 36, aspects of the present disclosure flange assembly 60 are applicable for any blind assemblies in which a fastener, such as a bolt, may have one side (e.g., a head of the bolt) that is inaccessible during a portion of an assembly sequence. Accordingly, the present disclosure should not be understood to be limited to compressors such as the low-pressure compressor 40, turbofan gas turbine engines, such as the gas turbine engine 10, or even gas turbines engines in general, and may be relevant in the assembly of other forms of machinery and industrial equipment as well.

Figure 5:
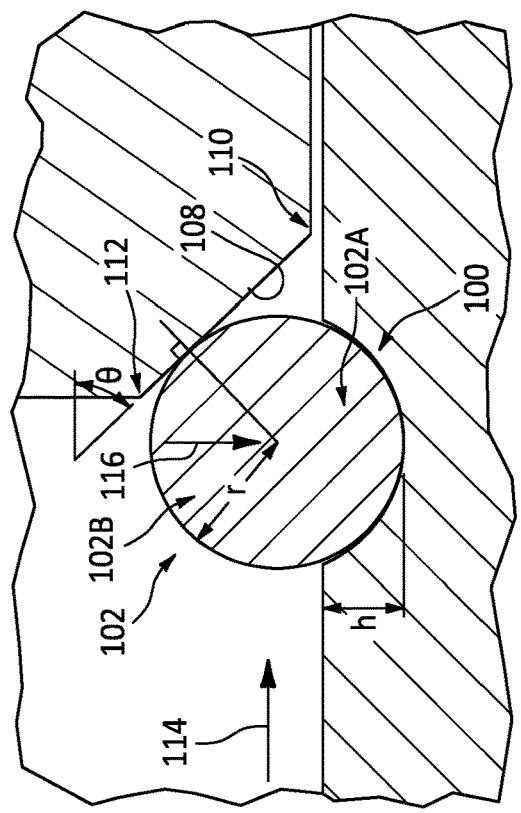
FIG. 5 illustrates a side cross-sectional view of a portion of the flange assembly of FIG. 4, in accordance with one or more embodiments of the present disclosure.

Referring to FIGS. 4-12, side cross-sectional views of embodiments of the flange assembly 60 are illustrated including a bolt 80 of the plurality of bolts 80 installed in respective ones of the plurality of primary bolt apertures 68 and the plurality of secondary bolt apertures 78. The bolt 80 includes an annular groove 100 formed in the annular surface 90 of the bolt body 82 and disposed about the bolt axis 88. The flange assembly 60 further includes a clip 102 attached to the bolt body 82 within the annular groove 100. In other words, the clip 102 is seated within the annular groove 100. The clip 102 is positioned between the primary flange 56 and the secondary flange 58. The clip 102 may be configured as a C-clip (sometimes known as a "circlip") which may be formed by a semi-rigid ring with open ends which can be snapped into place about the bolt axis 88 within the annular groove 100. As shown in FIG. 5, the clip 102 includes a first radial portion 102A positioned radially within the annular groove 100 and a second radial portion 102B positioned radially outside the annular groove 100, with respect to the bolt axis 88. Accordingly, any dislodging force (e.g., an axial force) applied to the bolt 80 may cause the clip 102 to contact the second primary surface 66 of the primary flange body 62 of the primary flange 56, thereby potentially preventing the bolt 80 from being dislodged from the flange assembly 60. However, in some cases, more significant dislodging forces may be capable of unseating the clip 102 from the annular groove 100, thereby allowing the bolt 80 to become dislodged from the flange assembly 60.

The secondary flange body 70 may include an annular recess 104 formed between the secondary bolt aperture 78 and the first secondary surface 72. The clip 102 may be axially retained within the annular recess 104, with respect to the bolt axis 88. With the clip 102 positioned within the annular groove 100 of the bolt body 82, the secondary flange body 70 may be radially spaced from the clip 102, with respect to the bolt axis 88, at the location of the annular recess 104.

Referring to FIGS. 4 and 5, in some embodiments, the primary flange body 62 may include an annular chamfer 106 extending from the primary bolt aperture 68 to the second primary surface 66. The annular chamfer 106 is disposed about the bolt axis 88. The annular chamfer 106 is positioned axially adjacent the clip 102, with respect to the bolt axis 88. The annular chamfer 106 includes a chamfer surface 108 which extends between an inner radial chamfer end 110 and an outer radial chamfer end 112, with respect to the bolt axis 88. The chamfer surface 108 of FIGS. 3 and 4 is flat (e.g., linear) or substantially flat in a direction extending between the inner radial chamfer end 110 and the outer radial chamfer end 112. As will be discussed in further detail, an axial dislodging force (schematically illustrated in FIG. 5 as force 114), with respect to the bolt axis 88, applied to the bolt 80 may cause the clip 102 to contact the chamfer surface 108 of the annular chamfer 106. Thus, the chamfer surface 108 may apply a radial retention force (schematically illustrated in FIG. 5 as force 116), with respect to the bolt axis 88, to the clip 102 which pushes the clip 102 in the direction of the annular groove 100, thereby preventing or otherwise opposing the clip 102 from being unseated from the annular groove 100 by the axial dislodging force 114.

FIG. 5 illustrates the clip 102 in contact with the chamfer surface 108 of the annular chamfer 106 of FIG. 4. The annular groove 100 has a height h extending between a bottom of the annular groove 100 and the annular surface 90 of the bolt body 82. As shown in FIG. 5, the clip 102 has a circular or substantially circular cross-sectional shape with a cross-sectional radius r. The height h of the annular groove 100 is illustrated in FIG. 5 as being less than the cross-sectional radius r. However, the present disclosure is not limited to this particular relationship between the height h and the cross-sectional radius r, and the height h may alternatively be greater than or equal to the cross-sectional radius r. A chamfer angle Θ is defined between the chamfer surface 108 (e.g., from the inner radial chamfer end 110 to the outer radial chamfer end 112) and an axial line 116 which is parallel to the bolt axis 88. As shown in FIG. 5, the chamfer angle Θ of the chamfer surface 108 may be approximately forty-five degrees (45°). A minimum value of the chamfer angle Θ may be determined, for example, using Equation [1]:

$$\theta \leq \frac{1}{2}\cos^{-1}(1-\alpha), \text{ where } \alpha = \frac{h}{r} \qquad [1]$$

The chamfer angle Θ may preferably be between twenty degrees (20°) and sixty degrees (60°) or between thirty degrees (30°) and fifty degrees (50°).

Referring to FIGS. 6 and 7, in some embodiments, the chamfer surface 108 may be curved in a direction extending between the inner radial chamfer end 110 and the outer radial chamfer end 112. The chamfer surface 108 of FIG. 6 is convex between the inner radial chamfer end 110 and the outer radial chamfer end 112. The chamfer surface 108 of FIG. 7 is concave between the inner radial chamfer end 110 and the outer radial chamfer end 112. In some embodiments, the chamfer surface 108 may have a concave curvature which substantially matches the cross-sectional curvature of the clip 102.

Figure 8:
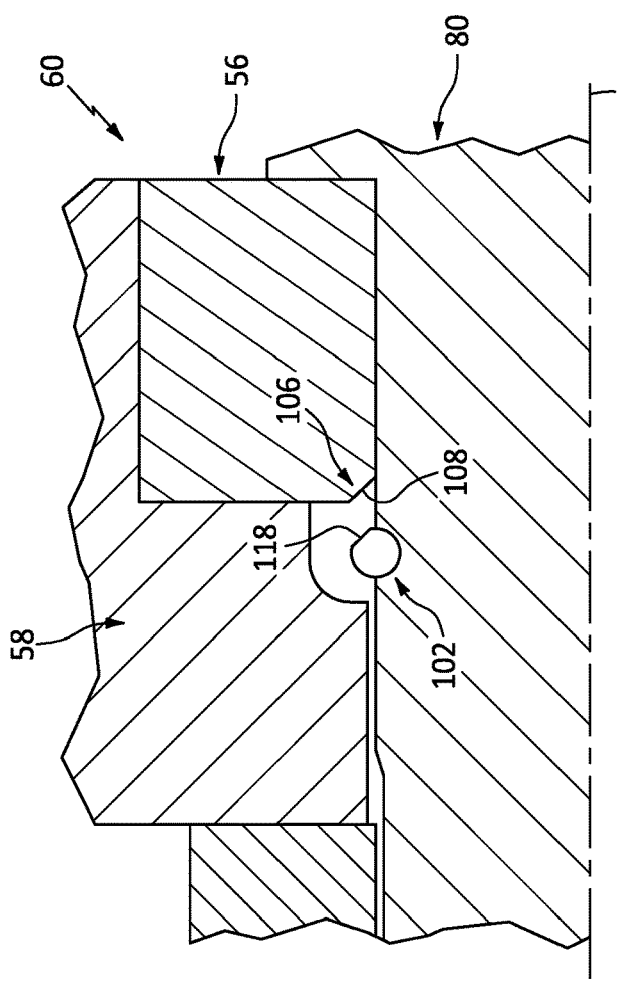
FIG. 8 illustrates a side cross-sectional view of a flange assembly for the compressor section of FIG. 2, in accordance with one or more embodiments of the present disclosure.

Referring to FIG. 8, in some embodiments, in clip 102 includes a cross-sectional flat surface 118. The cross-sectional flat surface 118 extends in a circumferential direction about the clip 102. The cross-sectional flat surface 118 is positioned on the clip 102 such that an axial withdrawal of the bolt 80 from the flange assembly 60 along the bolt axis 88 will cause the cross-sectional flat surface 118 to contact the chamfer surface 108 of the annular chamfer 106. In some embodiments, the cross-sectional flat surface 118 of the clip 102 may be substantially parallel to the chamfer surface 108 of the annular chamfer 106 of the primary flange body 62. As used herein, the term "substantially" with respect to a direction or angular relationship refers to the stated direction or angular relationship +/− five degrees (5°).

Figure 9:
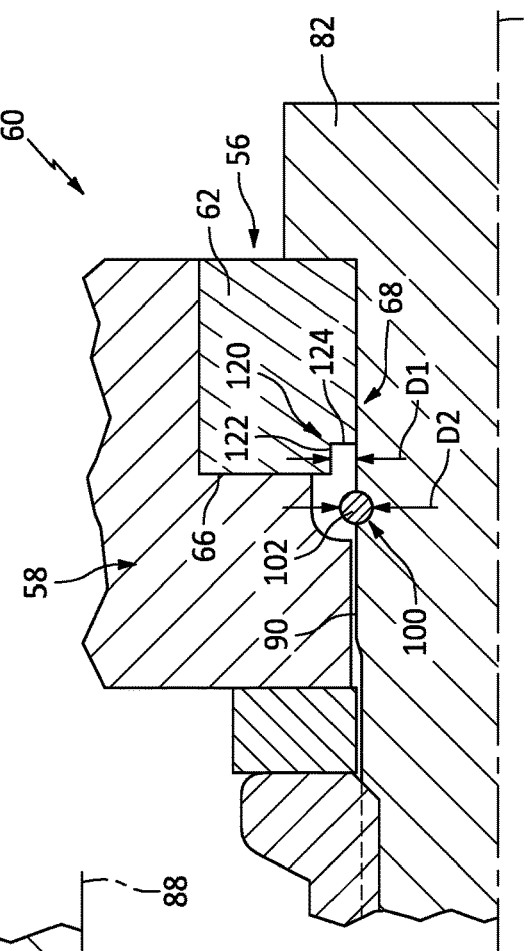
FIG. 9 illustrates a side cross-sectional view of a flange assembly for the compressor section of FIG. 2, in accordance with one or more embodiments of the present disclosure.

Referring to FIG. 9, in some embodiments, the primary flange body 62 may include an annular recess 120 extending from the primary bolt aperture 68 to the second primary surface 66. The annular recess 120 is disposed about the bolt axis 88. The annular recess 120 is positioned axially adjacent the clip 102, with respect to the bolt axis 88. As shown in FIG. 9, the annular recess 120 may have a substantially rectangular cross-sectional shape. In some embodiments, the annular recess 120 may include an axially-extending surface 122 and a radially-extending surface 124 which intersects the axially-extending surface 122. The axially-extending surface 122 may be spaced (e.g., radially spaced) from the annular surface 90 of the bolt body 82 by a distance D1. The distance D1 may be less than a cross-sectional diameter D2 of the clip 102. Accordingly, if the clip 102 is axially positioned within the annular recess 120, the axially-extending surface 122 may prevent (e.g., physically obstruct) the clip 102 from being unseated from the annular groove 100 of the bolt body 82.

Figure 10:
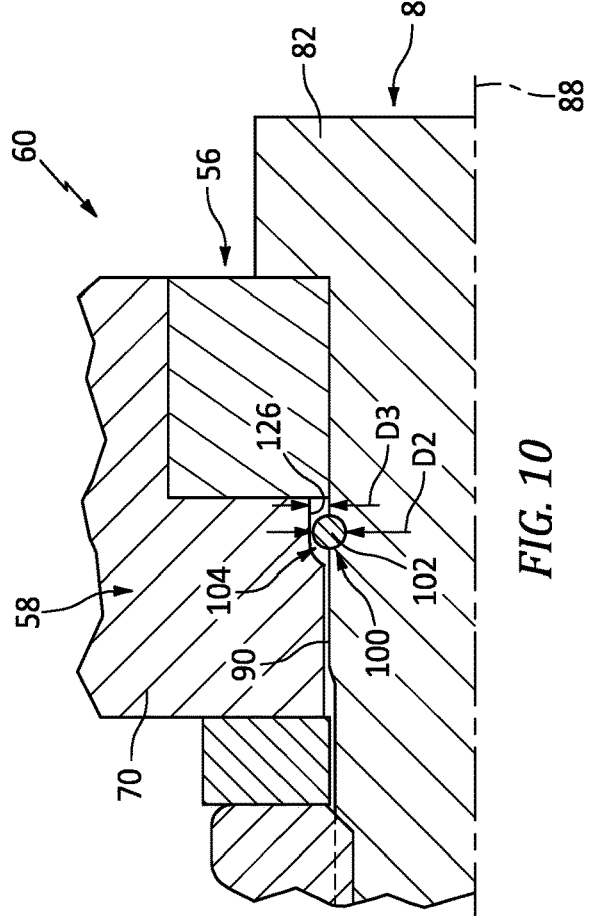
FIG. 10 illustrates a side cross-sectional view of a flange assembly for the compressor section of FIG. 2, in accordance with one or more embodiments of the present disclosure.

Referring to FIG. 10, in some embodiments, the secondary flange body 70 includes an axially-extending surface 126 which defines a portion of the annular recess 104. The axially-extending surface 126 may be spaced (e.g., radially spaced) from the annular surface 90 of the bolt body 82 by a distance D3. The distance D3 may be less than the cross-sectional diameter D2 of the clip 102. Accordingly, with the clip 102 axially positioned within the annular recess 104, the axially-extending surface 126 may prevent (e.g., physically obstruct) the clip 102 from being unseated from the annular groove 100 of the bolt body 82.

Figure 11:
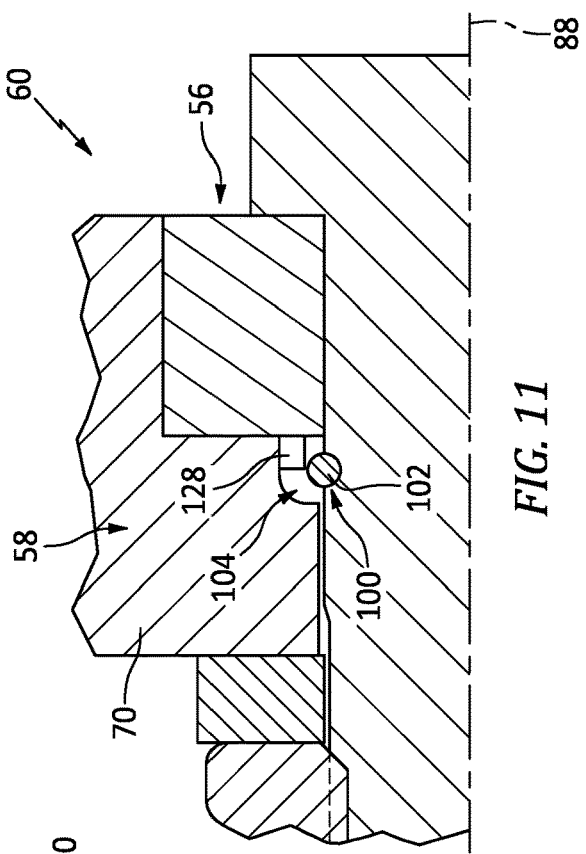
FIG. 11 illustrates a side cross-sectional view of a flange assembly for the compressor section of FIG. 2, in accordance with one or more embodiments of the present disclosure.

Referring to FIG. 11, in some embodiments, the flange assembly 60 may include a washer 128 disposed about the bolt body 82 and positioned between the primary flange 56 and the secondary flange 58. The washer 128 may be positioned axially within the recess 104 of the secondary flange body 70. As shown in FIG. 11, the washer 128 may be positioned radially outside of the clip 102, with respect to the bolt axis 88. Accordingly, the washer 128 may prevent (e.g., physically obstruct) the clip 102 from being unseated from the annular groove 100 of the bolt body 82.

Figure 12:
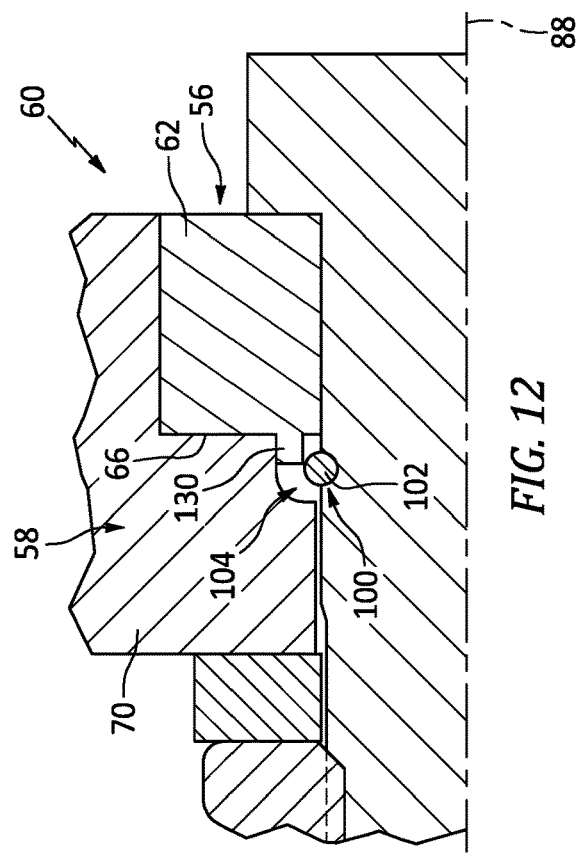
FIG. 12 illustrates a side cross-sectional view of a flange assembly for the compressor section of FIG. 2, in accordance with one or more embodiments of the present disclosure.

Referring to FIG. 12, in some embodiments, the primary flange body 62 may include an annular projection 130. The annular projection 130 may extend axially from the second primary surface 66 toward the secondary flange body 70, with respect to the bolt axis 88. The annular projection 130 may be positioned within the annular recess 104 of the secondary flange body 70. As shown in FIG. 12, the annular projection 130 may be positioned radially outside of the clip 102, with respect to the bolt axis 88. Accordingly, the annular projection 130 may prevent (e.g., physically obstruct) the clip 102 from being unseated from the annular groove 100 of the bolt body 82. In some embodiments, the annular projection 130 may be formed as a unitary structure with the primary flange body 62. The term "unitary structure," as used herein, means a single component, wherein the primary flange body 62 and the annular projection 130 are an inseparable body (e.g., formed of a single material, or a weldment of independent elements, etc.). A unitary structure of the primary flange body 62 and the annular projection 130 may decrease the potential for foreign object damage ("FOD") to the gas turbine engine 10.

It is noted that various connections are set forth between elements in the preceding description and in the drawings. It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities. It is further noted that various method or process steps for embodiments of the present disclosure are described in the following description and drawings. The description may present the method and/or process steps as a particular sequence. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the description should not be construed as a limitation.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

While various aspects of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these particular features may be described individually, it is within the scope of the present disclosure that some or all of these features may be combined with any one of the aspects and remain within the scope of the present disclosure. References to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Accordingly, the present disclosure is not to be restricted except in light of the attached claims and their equivalents.

The invention claimed is:

1. A flange assembly comprising:
   a primary flange including a primary flange body, the primary flange body including a first primary surface and a second primary surface opposite the first primary surface, the primary flange body defining a primary bolt aperture extending from the first primary surface to the second primary surface;
   a secondary flange positioned adjacent the primary flange, the secondary flange including a secondary flange body, the secondary flange body including a first secondary surface and a second secondary surface opposite the first secondary surface, the secondary flange body defining a secondary bolt aperture extending from the first secondary surface to the second secondary surface;
   a bolt including a bolt body extending between a head end and a distal end along a bolt axis, the bolt body including an annular surface disposed about the bolt axis, the bolt body further including an annular groove formed in the annular surface and disposed about the bolt axis, the bolt body positioned within the primary bolt aperture and the secondary bolt aperture, the bolt further including a nut detachably mounted to the bolt body such that the primary flange and the secondary flange are positioned between the head end and the nut with the head end adjacent the primary flange; and
   a clip attached to the bolt body within the annular groove, the clip positioned between the between the primary flange and the secondary flange.

2. The flange assembly of claim 1, wherein the secondary flange body includes an annular recess formed between the secondary bolt aperture and the first secondary surface and wherein the clip is axially positioned within the annular recess.

3. The flange assembly of claim 2, further comprising a washer disposed about the bolt body and positioned between the primary flange and the second flange, the washer positioned axially within the recess of the secondary flange body.

4. The flange assembly of claim 3, wherein the washer is positioned radially outside of the clip.

5. The flange assembly of claim 2, wherein the primary flange body includes an annular projection, the annular projection extending axially from the second primary surface toward the first secondary surface, the annular projection positioned within the recess of the secondary flange body.

6. The flange assembly of claim 5, wherein the annular projection is positioned radially outside of the clip.

7. The flange assembly of claim 1, wherein a first radial portion of the clip is positioned radially inside the groove and a second radial portion of the clip is positioned radially outside of the groove.

8. The flange assembly of claim 1, wherein the primary flange body includes an annular recess extending from the primary bolt aperture to the second primary surface, the annular recess positioned axially adjacent the clip, the annular recess including an axially extending surface and a radially extending surface, the axially extending surface spaced from the annular surface of the bolt body by a distance and the distance is less than a cross-sectional diameter of the clip.

9. The flange assembly of claim 1, wherein the primary flange body includes an annular chamfer extending from the primary bolt aperture to the second primary surface, the annular chamfer positioned axially adjacent the clip.

10. The flange assembly of claim 9, wherein the annular chamfer includes a chamfer surface extending between an inner radial chamfer end and an outer radial chamfer end.

11. The flange assembly of claim 10, wherein the chamfer surface is flat in a direction extending between the inner radial chamfer end and the outer radial chamfer end.

12. The flange assembly of claim 11, wherein the clip includes a cross-sectional flat surface.

13. The flange assembly of claim 12, wherein the cross-sectional flat surface is substantially parallel to the chamfer surface of the annular chamfer of the primary flange body.

14. The flange assembly of claim 10, wherein the chamfer surface is disposed at an angle relative to a radial line, and the angle is between 20 and 60 degrees.

15. The flange assembly of claim 10, wherein the chamfer surface is convex between the inner radial chamfer end and the outer radial chamfer end.

16. The flange assembly of claim 10, wherein the chamfer surface is concave between the inner radial chamfer end and the outer radial chamfer end.

17. A method for assembling a flange assembly, the method comprising:
    inserting a bolt, in a first axial direction, into a primary bolt aperture of a primary flange, the bolt including a bolt body extending between a head end and a distal end along a bolt axis, the bolt body including an annular surface disposed about the bolt axis, the bolt body further including an annular groove formed in the annular surface and disposed about the bolt axis, the primary flange including a primary flange body, the primary flange body including a first primary surface and a second primary surface opposite the first primary surface;
    installing a clip onto the bolt so that the clip is attached to the bolt body within the annular groove;
    installing a secondary flange onto the bolt in a second axial direction, opposite the first axial direction, so that the bolt body is positioned within a secondary bolt aperture of the secondary flange with the secondary flange positioned adjacent the primary flange and with the clip positioned between the primary flange and the secondary flange, the secondary flange including a secondary flange body, the secondary flange body including a first secondary surface and a second secondary surface opposite the first secondary surface; and
    mounting a nut to the bolt body with the primary flange and the secondary flange positioned between the head end and the nut.

18. The method of claim 17, wherein the secondary flange body includes an annular recess formed between the secondary bolt aperture and the first secondary surface and wherein the clip is axially positioned within the annular recess, subsequent to the step of installing the secondary flange.

19. The method of claim 17, wherein the primary flange body includes an annular chamfer extending from the primary bolt aperture to the second primary surface, the annular chamfer positioned axially adjacent the clip, subsequent to the step of installing the clip onto the bolt.

20. A flange assembly comprising:
    a primary flange including a primary flange body, the primary flange body including a first primary surface and a second primary surface opposite the first primary surface, the primary flange body defining a primary bolt aperture extending from the first primary surface to the second primary surface, the primary flange body including an annular chamfer extending from the primary bolt aperture to the second primary surface;
    a bolt including a bolt body extending between a head end and a distal end along a bolt axis, the bolt body including an annular surface disposed about the bolt axis, the bolt body further including an annular groove formed in the annular surface and disposed about the bolt axis, the bolt body positioned within the primary bolt aperture with the head end adjacent the first primary surface; and
    a clip attached to the bolt body within the annular groove, the clip positioned axially adjacent the annular chamfer.

* * * * *